(12) United States Patent
Naber et al.

(10) Patent No.: US 7,415,347 B2
(45) Date of Patent: Aug. 19, 2008

(54) COMBUSTION KNOCK DETECTION AND CONTROL THROUGH STATISTICAL CHARACTERIZATION OF KNOCK LEVELS

(75) Inventors: Jeffrey D. Naber, Houghton, MI (US); Satheesh Rajh Rajagopalan, Houghton, MI (US)

(73) Assignee: Michigan Technological University, Houghton, MI (US)

( * ) Notice: Subject to any disclaimer, the term of this patent is extended or adjusted under 35 U.S.C. 154(b) by 0 days.

(21) Appl. No.: 11/467,313

(22) Filed: Aug. 25, 2006

(65) Prior Publication Data
US 2008/0051981 A1 Feb. 28, 2008

(51) Int. Cl.
*B06F 19/00* (2006.01)
*G01L 23/22* (2006.01)
(52) U.S. Cl. .................. 701/111; 701/114; 73/35.04
(58) Field of Classification Search .......... 701/101, 701/111, 114, 115; 73/35.04
See application file for complete search history.

(56) References Cited

U.S. PATENT DOCUMENTS

| 4,346,586 | A | | 8/1982 | Furrey |
| 5,052,214 | A | * | 10/1991 | Dils ................ 73/35.04 |
| 5,099,681 | A | * | 3/1992 | Dils ................ 73/35.07 |
| 5,188,080 | A | | 2/1993 | Sakakibara et al. |
| 5,269,178 | A | | 12/1993 | Vigmostad et al. |
| 5,386,722 | A | * | 2/1995 | Meyer et al. .......... 73/117.3 |
| 5,400,644 | A | | 3/1995 | Remboski, Jr. et al. |
| 5,537,855 | A | | 7/1996 | Hunninghaus et al. |
| 6,456,927 | B1 | | 9/2002 | Frankowski et al. |
| 6,845,312 | B1 | | 1/2005 | Cross et al. |
| 2006/0101902 | A1 | | 5/2006 | Christensen |
| 2006/0106523 | A1 | | 5/2006 | Ancimer |

OTHER PUBLICATIONS

Jeffrey D. Naber, Jason R. Blough, Dave Frankowski, Monroe Goble, and John E. Szpytman, "Analysis of Combustion Knock Metrics in Spark-Ignition Engines" SAE 2006-01-0400, Apr. 3-6, 2006.
Guoming G. Zhu, Ibrahim Haskara, and Jim Winkelman, "Stochastic Limit Control and its Application to Knock Limit Control Using Ionization Feedback" SAE 2005-01-0018, Apr. 11-14, 2005.
Klara Sinnerstad, "Knock Intensity and Torque Control on an SVC Engine" Master's Thesis, Dec. 12, 2003.

* cited by examiner

*Primary Examiner*—John T. Kwon
(74) *Attorney, Agent, or Firm*—Michael Best & Friedrich LLP (57) ABSTRACT

A method of statistically characterizing combustion knock events includes receiving signals from a sensing device such as an accelerometer, estimating at least one parameter of a probability distribution function based on the received signals, and calculating a value indicative of an $n^{th}$ percentile based on the parameter to predict upcoming combustion knock events.

40 Claims, 5 Drawing Sheets

COMBUSTION KNOCK DETECTION AND CONTROL THROUGH STATISTICAL CHARACTERIZATION OF KNOCK LEVELS

BACKGROUND

The present invention relates to the detection and control of combustion knock events in an internal combustion (IC) engine. Generally, accelerometers mounted on an engine block are used to detect vibrations of the engine caused by pressure waves that are the result of knock events. Based on the signals generated by the accelerometers, knock detection systems relying on digital signal processing techniques, determine signal levels in frequency ranges during crank-angles where knock events are not expected to occur. Additionally, this signal processing can also be done during crank-angles where knock events are expected to occur. The knock intensities measured, usually on an individual cylinder basis, are used in methods of closed loop control to reduce the effects of knock events.

Some technologies that enable individual cylinder detection and control of combustion knock events do not account for the stochastic and non-stationary nature of knock intensities. As a result, these control systems can under or over estimate the level of knock in an engine and result in non-optimal operation of the engine.

SUMMARY

In one embodiment, the invention provides a method of statistically characterizing combustion events in a combustion engine. The method includes receiving at least one signal indicative of knock level associated with combustion events, estimating at least one parameter of a probability density function and a cumulative distribution function based on receiving the at least one signal, and estimating a probability distribution of the at least one signal based on estimating the at least one parameter.

In another embodiment, the invention provides a method of predicting combustion knock events based on real-time statistical characterization of knock level metrics. The method includes receiving at least one signal indicative of knock level, and estimating a first parameter of a probability density function and a cumulative distribution function based on the at least one signal indicative of knock level. The method also includes calculating a first value indicative of an $n^{th}$ percentile of the at least one signal, calculating a second value indicative of the $n^{th}$ percentile of the at least one signal, and comparing the first value to the second value to predict an upcoming combustion knock event.

In another embodiment, the invention provides a method of predicting combustion knock events based on knock level values substantially independent of knock conditions. The method includes receiving at least one signal indicative of knock level, estimating a first parameter of a probability density function and a cumulative distribution function based on the at least one signal indicative of knock level, and calculating a first value indicative of a first $n^{th}$ percentile of the at least one signal based on the first parameter. The method also includes calculating a second value indicative of a second $n^{th}$ percentile of the at least one signal based on the first parameter, and normalizing the first value with respect to the second value to predict an upcoming combustion knock event substantially independent on knock conditions.

In another embodiment, the invention provides a method of substantially eliminating a measurement error related at least to a gain of an accelerometer coupled to an engine for predicting combustion knock events. The method includes generating at least one electric signal with the accelerometer, calculating at least one knock level based on the at least one electric signal, and estimating a first parameter of a probability density function and a cumulative distribution function based on the at least one knock level. The method also includes calculating a first value indicative of a first $n^{th}$ percentile of the at least one knock level based on the first parameter, calculating a second value indicative of a second $n^{th}$ percentile of the at least one knock level based on the first parameter, and normalizing the first value with respect to the second value for substantially eliminating the measurement error in predicting upcoming combustion knock events.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
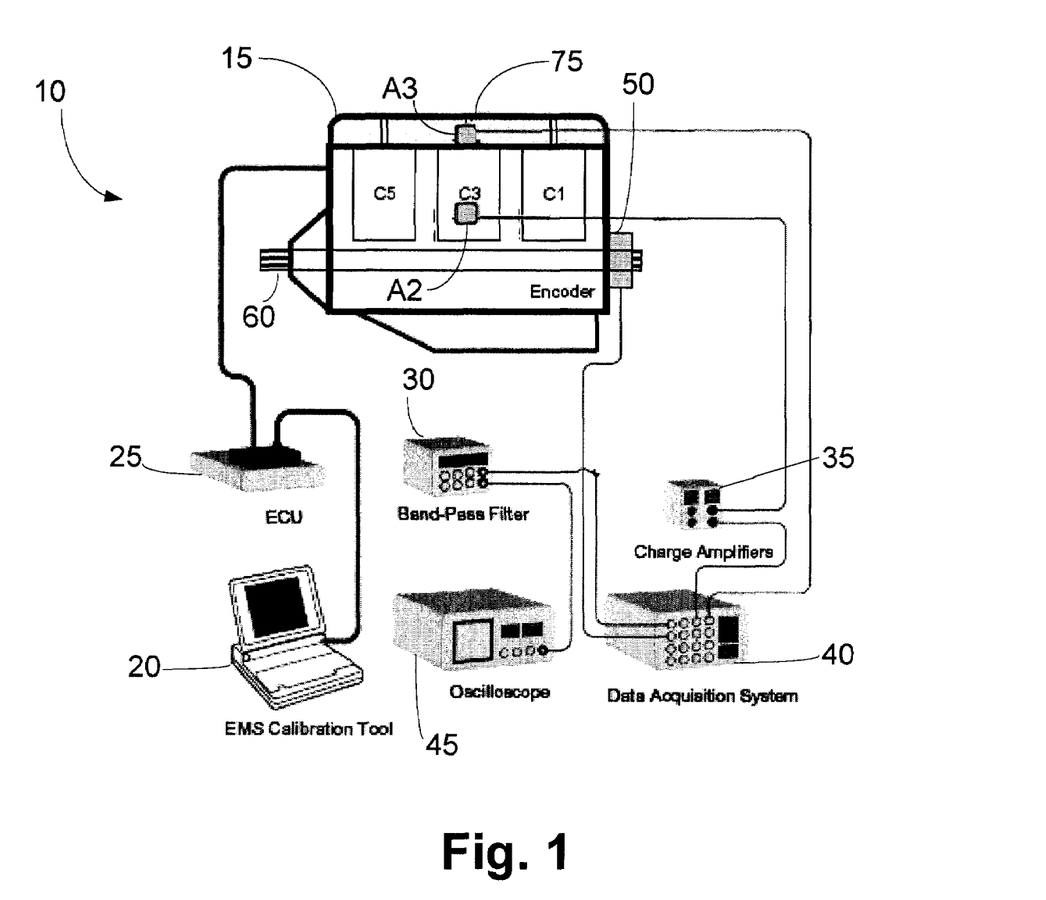
FIG. 1 is a schematic representation of an engine and test equipment for detecting and characterizing combustion knock events.

FIG. 1 is a schematic representation of an experimental set up 10 to detect knock level information in a spark-ignition engine. In the experimental set up 10, an engine 15 (also shown in FIG. 1A) is controlled by an engine management system (EMS) including an EMS calibration tool 20 and an engine control unit (ECU) 25. The experimental set up 10 includes three accelerometers A1, A3, and A3, six pressure transducers (PT), and equipment to detect signals generated by the accelerometers and pressure transducers. The equipment shown in FIG. 1 includes a band-pass filter 30, a charge amplifier 35, a data acquisition system 40, and an oscilloscope 45. Additionally, an encoder 50 is coupled to a crankshaft 60 of the engine 15 to detect the position of the crankshaft 60 and send position related information to the data acquisition system 40.

Figure 1A:
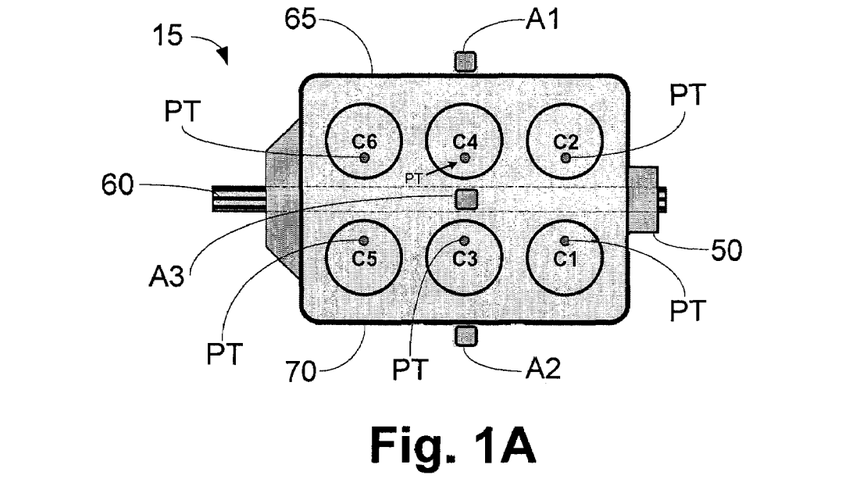
FIG. 1A is a schematic top view of an engine shown in FIG. 1.

In reference to FIGS. 1 and 1A, each of the pressure transducers is mounted in the cylinder head adjacent to the spark plugs to measure in-cylinder pressure. Additionally, accelerometers A1 and A2 are mounted on a first side wall 65 and a second side wall 70 of the engine 15 (better illustrated in FIG. 1A), respectively. Accelerometers A1 and A2 are also located substantially adjacent to or aligned with cylinders C4 and C3, respectively. Accelerometer A3 is located on an upper portion 75 of the engine 15 (better illustrated in FIG. 1) and between cylinders C3 and C4 (better illustrated in FIG. 1A). The experimental set up 10 is configured to detect signals from the pressure transducers and the accelerometers to determine knock level information from each one of the pressure transducers and accelerometers. More specifically, knock events in each cylinder generate a difference in pressure, detected by the pressure transducers, and also vibrations of the engine 15, detected by the accelerometers.

The equipment shown in FIG. 1 detects the signals from the pressure transducers and accelerometers to determine knock level information. Knock level information can also be indicative or identified as knock intensity, knock energy, knock peaks, pressure intensity, accelerometer intensity, or any other quantitative measurement generated due to knock events. It is to be understood that the experimental set up 10 is shown only for illustrative purposes. In other set ups similar to the experimental set 10, characterization of combustion knock events can be performed by the ECU 25 coupled to the engine 15 and at least one of the accelerometers A1, A2, and A3. Any other set ups including sensor mechanisms, such as accelerometers, pressure transducers, or ionization transducers to measure in-cylinder gas characteristics, and processing mechanisms, such as an ECU, are possible and fall within the scope of the invention.

For example, another set up for detecting and quantifying knock events is illustrated in U.S. Pat. No. 5,537,855, the contents of which are incorporated herein by reference. Generally described in U.S. Pat. No. 5,537,855 is a knock detection mechanism including a knock sensor providing a knock sensor signal over a first window, when knock events are expected, and a second window, when knock events are not expected. The first window and the second window are defined by the position of the crankshaft driving the cylinders of an engine. The knock detection mechanism, coupled or incorporated to an ECU, for example, generates a form of knock level information based on knock events. It is to be understood that the experimental set up 10 shown in FIG. 1 and the knock detection apparatus of U.S. Pat. No. 5,537,855 are only exemplary systems for generating knock level information and they do not limit the scope of the invention. Moreover, knock level information may be generated by other suitable means that perform real-time determination and application of statistical metrics, as disclosed through out this application.

Figure 2:
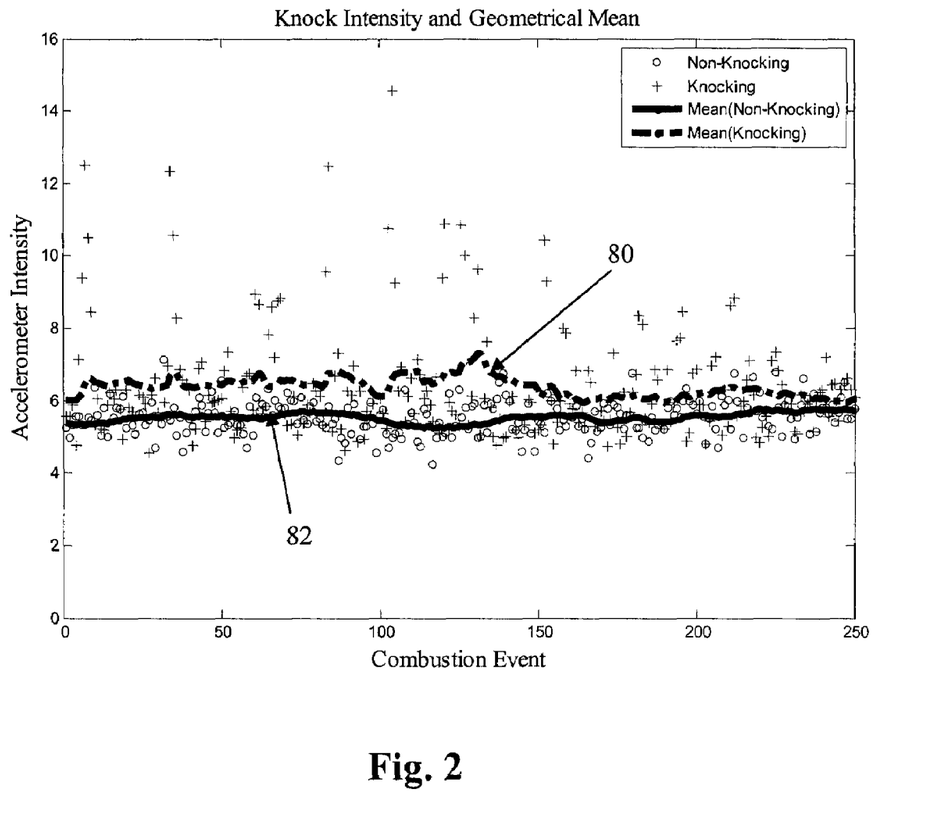
FIG. 2 is a representation of knock intensities and their geometric means for a number of combustion events.

FIG. 2 shows knock level information in the form of knock intensities and the geometrical means of the knock intensities shown as a function of combustion events. More specifically, FIG. 2 shows knock intensities under knocking conditions (identified with "+"), knock intensities under non-knocking conditions (identified with "o"), the geometric means of the knock intensities under knocking conditions (line 80), and the geometric means of the knock intensities under non-knocking conditions (line 82). In this particular case, the knock intensities are determined based on signals generated by at least one accelerometer, such as the ones shown in FIG. 1. The knock intensities and the geometric means of the knock intensities are determined over 250 combustion events. The geometric means of the knock intensities indicate that a knock event in a combustion event generally generates higher knock intensity (knock level) than when the knock event is not present in a combustion event. The information shown in FIG. 2 is one example of the information sensed and utilized in real-time statistical analysis disclosed in this application to characterize combustion knock events in order to predict and substantially prevent upcoming knock events.

Figure 3:
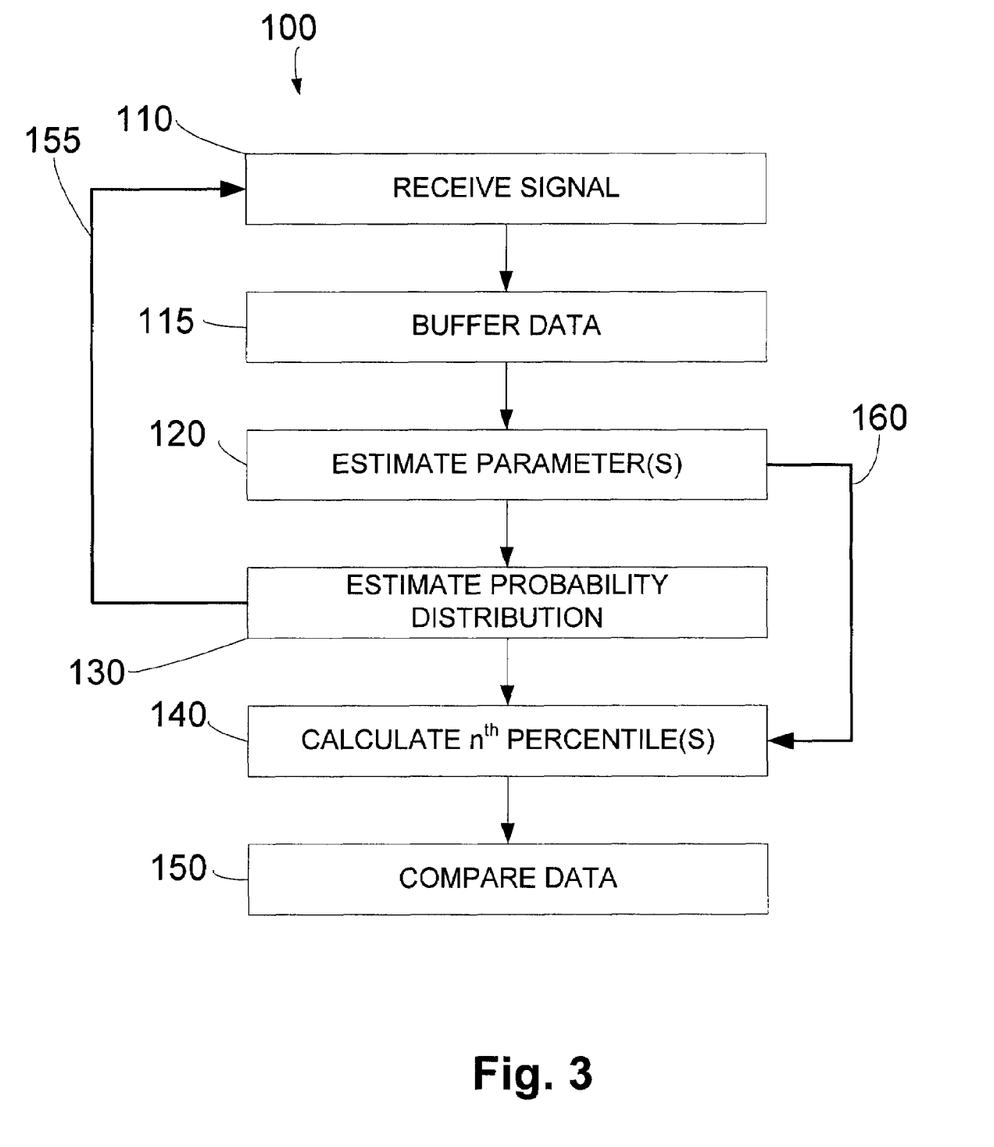
FIG. 3 is a flow chart illustrating an exemplary process to characterize knock level information.

FIG. 3 shows a flow chart 100 including some possible steps for the characterization and analysis of combustion knock events. The steps shown in the flow chart 100 are only exemplary and the characterization process can include other steps not illustrated. Any combination of the steps shown in the flow chart 100 may be included in an engine control unit (ECU), such as the one shown in FIG. 1, to perform real-time statistical analysis and predict upcoming combustion knock events based on real-time detection of combustion knock events and analysis of knock intensities determined based on signals generated by the accelerometers, pressure transducers, or other knock sensing devices and methods. For example, an acquisition system coupled or incorporated to the ECU receives signals from one accelerometer (step 110). In some cases, the signals can be received under knocking conditions and non-knocking conditions of an engine. In other cases, the signals are only received under knocking conditions or non-knocking conditions. In yet other cases, received signals need not be classified. For example, the knock intensities shown in FIGS. 2, 4 and 5 have been labeled based on signals received by the ECU under knocking conditions and non-knocking conditions.

The ECU can receive the signals generated by the accelerometers or pressure transducers, and store the signals in a buffer of length N, for example (step 115). Buffering the signals, as shown in FIG. 3, can include storing a numeric value for each received signal indicative of the level of the received signal. Buffering the signals can also include computing a quantity based on the received signals, such a logarithm of each received signal, and storing the computed quantities in the buffer of length N. In the case of real-time characterization, as disclosed in this application, signals stored in the buffer of length N (where N can be any natural number, for example N=30) can be continuously updated for substantially every combustion event. Buffering the signals generally allows for calculating averages and standard deviations, and performing other statistical calculations and analyses based on the signals or quantities stored in the buffer of length N.

For the purposes of real-time characterization of the combustion knock events, parameters $\mu$ and $\sigma$ are estimated (step 120) in the process illustrated in FIG. 3. These parameters $\mu$ and $\sigma$ are particular of a log-normal distribution. However, other distributions that can be used for the process of characterization of combustion knock events can include other parameters or include any number of parameters. The parameters are generally estimated based on the received signals from the accelerometer (or any other sensing device, such as the pressure transducers). More specifically, the processes utilized to generate dynamic estimates of the parameters $\mu$ and $\sigma$ can include calculating the running average and standard deviation of the logarithm of the received signals for a predetermined number of received signals, where the signals are continuously updated for real-time characterization. Other processes to estimate parameters $\mu$ and $\sigma$ can include calculating a weighted average and standard deviation of the logarithm of the received signals, process the logarithm of the signals with an IIR digital filter, or process the logarithm of the signals with an FIR digital filter. It is to be understood that calculating parameters of other distributions is dependent on the type of distribution utilized to characterize the combustion knock events.

Based on the parameters estimated in step 120, it is possible to estimate the probability distribution function (step 130), which is associated with the received signals. In the particular case of estimating parameters $\mu$ and $\sigma$, a log-normal distribution is estimated based on these parameters. However, distributions with other parameters may be used to characterize the knock intensities, such as, for example, a beta distribution, a chi-squared distribution, a gamma distribution, an inverse chi-distribution, and an inverse gamma distribution. The estimated parameters can also be used to estimate the probability density function (PDF) and the cumulative distribution function (CDF) of the log-normal probability distribution. The PDF and CDF are characteristic of the probability distribution function and are generally indicative of how the estimated probability distribution function fits the information corresponding to the knock intensities based on the received signals.

Figure 4:
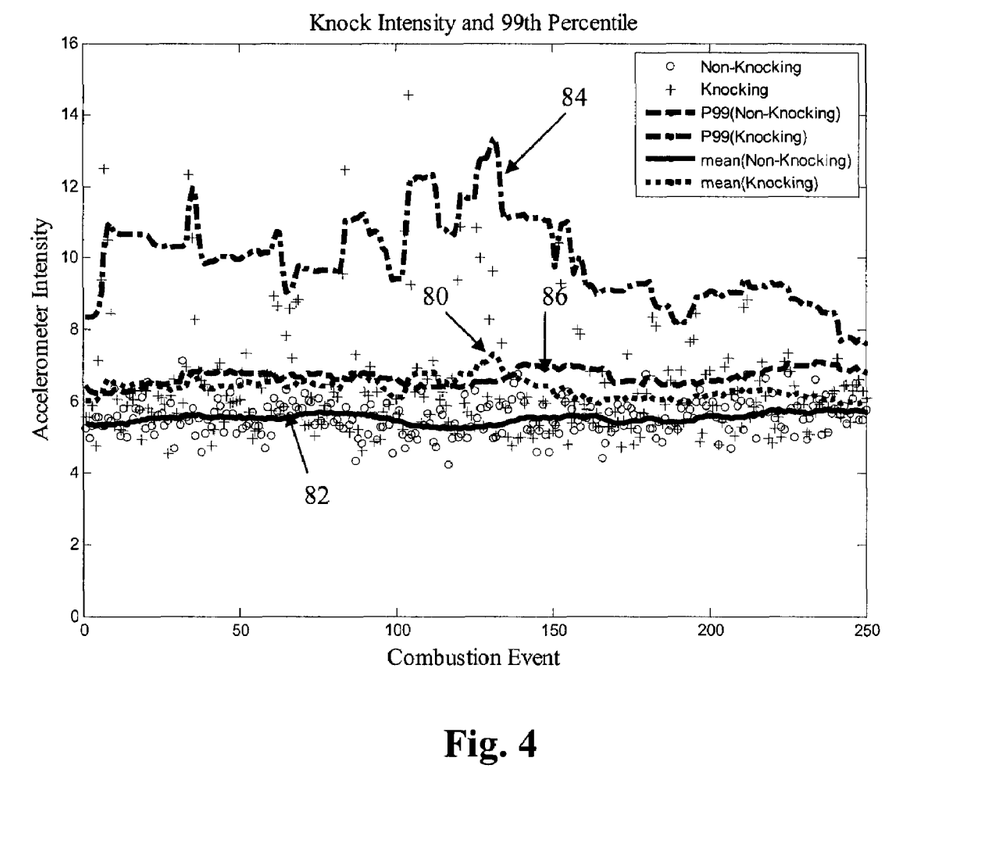
FIG. 4 is a representation of the $99^{th}$ percentile of knock intensities shown in FIG. 2 under knocking and non-knocking conditions.

Subsequent to estimating the parameters $\mu$ and $\sigma$, it is possible to calculate various dynamic estimates of the $n^{th}$ percentiles (step 140) of the knock intensity values. More specifically, calculating $n^{th}$ percentiles allows for comparing desired knock intensities or knock level information under specific knocking conditions (step 150). Comparing knock intensities may include calculating the difference between different $n^{th}$ percentiles, calculating a ratio of different $n^{th}$ percentiles, or any other suitable comparison. For example, FIG. 4 shows the $99^{th}$ percentile based on estimating parameters $\mu$ and $\sigma$. More specifically, the calculated $99^{th}$ percentile corresponds to the $99^{th}$ percentile of knock intensities under knocking conditions (line 84) and the $99^{th}$ percentile of knock intensities under non-knocking conditions (line 86). Also shown in FIG. 4 are the knock intensities and the geometric means of the knock intensities shown in FIG. 2 under knocking condition and non-knocking conditions. It is possible to observe that by estimating parameters $\mu$ and $\sigma$, and subsequently calculating the $99^{th}$ percentile based on the estimated parameters, the difference in knock intensities indicating knock events and the knock intensities indicating regular combustions events (no knock events present) is better appreciated in FIG. 4 than in FIG. 2. Thus, through the observation of the knock intensities in FIG. 4, it is possible to predict upcoming knock events at step 150. Referring particularly to step 140 shown in FIG. 3, it is to be understood that the process is not limited to calculating the $99^{th}$ percentile. Any other percentiles may be calculated, for example a percentile between about $80^{th}$ percentile and about $99^{th}$ percentile may be calculated to evaluate the difference between knock intensities under knocking and non-knocking conditions.

Figure 5:
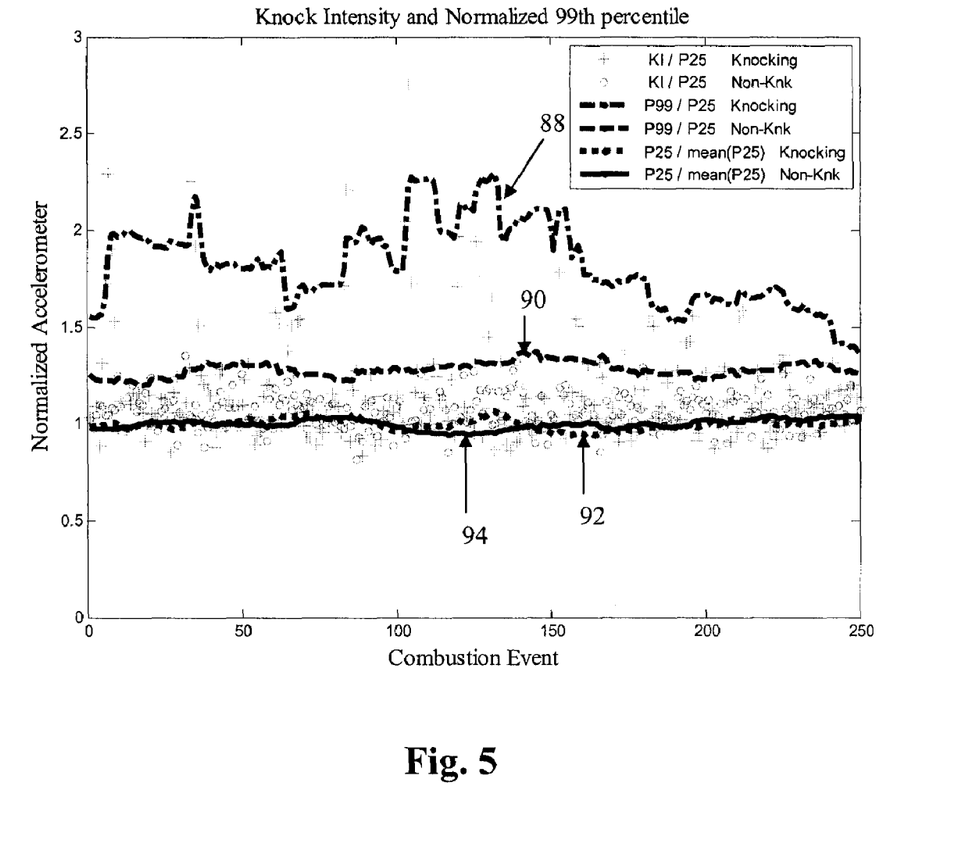
FIG. 5 is a representation of normalized knock intensities.

In other cases, it is possible to normalize the knock intensities (step 150) by calculating a relatively higher $n^{th}$ percentile, such a $99^{th}$ percentile, and a relatively lower $n^{th}$ percentile, such as a $25^{th}$ percentile, as shown in FIG. 5. More specifically, FIG. 5 shows the $99^{th}$ percentile of knock intensities under knocking conditions normalized by the $25^{th}$ percentile of knock intensities under knocking conditions (line 88), and the $99^{th}$ percentile of knock intensities under non-knocking conditions normalized by the $25^{th}$ percentile of knock intensities under non-knocking conditions (line 90). FIG. 5 also shows the ratio of the $25^{th}$ percentile of knock intensities under knocking conditions with respect to the geometric means of knock intensities under knocking conditions (line 92), the ratio of the $25^{th}$ percentile of knock intensities under non-knocking conditions with respect to the geometric means of knock intensities under non-knocking conditions (line 94), the ratio of knock intensities under knocking conditions with respect to the $25^{th}$ percentile of knock intensities under knocking conditions ("+"), and the ratio of knock intensities under non-knocking conditions with respect to the $25^{th}$ percentile of knock intensities under non-knocking conditions ("o").

By observing lines 92 and 94, it is possible to determine that the $25^{th}$ percentiles of knock intensities under knocking condition and non-knocking conditions define a ratio of substantially 1 with respect to the geometric means of the knock intensities under knocking condition and non-knocking conditions, respectively. Calculating the $25^{th}$ percentile of knock intensities substantially isolates the knock intensities of combustion events that generally do not include knock events regardless of knocking conditions. Thus, it is possible to utilize the $25^{th}$ percentile of the knock intensities regardless of knocking conditions, or any other relatively lower $n^{th}$ percentile, to normalize knock intensities. In the particular case of knock intensities based on accelerometer readings, sometimes the gain of the accelerometer is not well controlled and the amplitude of the signal generated by the accelerometer may vary by a significant factor (for example, by a factor of about 2). Normalizing the $99^{th}$ percentile of the knock intensities by the $25^{th}$ percentile of the knock intensities (P99/P25) allows for a continuous (dynamic) correction of the gain error. More specifically, the value of the ratio P99/P25, shown in FIG. 5, represents a dynamic gain corrected knock intensity without dependency on the knock level or knocking conditions.

Normalizing the knock intensities by calculating $n^{th}$ percentiles allows an acquisition system to receive signals from any suitable knock sensing device under knocking conditions, non-knocking conditions, of both because normalizing the knock intensities provides normalized knock intensities that are independent of knocking conditions. In addition, if an engine was to be operated under known knocking and non-knocking conditions, the methods explained above would allow for estimating the background level of noise and use this information to perform further compensation and processing of the knocking intensities to prevent upcoming knock events.

The methods described above may also be used with other spark-ignition fuelled engines such as flex-fuel (gasoline/ethanol mixture), ethanol, gasoline/hydrogen mixtures, hydrogen, natural gas, and others. The methods described above may also be used with other engine combustion types such as diesel and low-temperature-combustion including homogeneous-charge-compression-ignition. A first exemplary configuration can include test equipment, similar to the experimental set up 10 shown in FIG. 1, and may be utilized to estimate an appropriate probability distribution function for a particular engine. For that purpose, following all the steps shown in FIG. 3 can help determine, under controlled conditions, the appropriate distribution function that best fits the knock level information received by suitable sensors (e.g. accelerometers, pressure transducers) and characterized by an ECU, for example.

A second exemplary configuration can include an ECU coupled to a suitable sensing apparatus and mounted in a vehicle. The instructions included in the ECU for the second exemplary configuration can include a predetermined probability distribution function to characterize the combustion events. Thus, the second exemplary configuration can perform real-time characterization of combustion events, indicate or determine the likelihood of a combustion knock event in a subsequent combustion cycle, and utilize the results of the characterization process in a closed loop knock control system to control the engine and substantially prevent an upcoming combustion knock event. In one case, the ECU can first perform steps 110, 115, 120, and 130 (i.e., then loop back to step 110 via line 155) to estimate a probability distribution, and subsequently perform steps 110, 115, 120, 140, and 150 (i.e., skipping step 130 via line 160) for each signal generated by the suitable sensing apparatus. In another case, instructions corresponding to an estimated probability distribution can be preprogrammed in the ECU and the ECU would only perform steps 110, 115, 120, 140, and 150 to predict upcoming knock events. In yet other cases, the ECU would follow the steps 110, 115, 120, 140, and 150 at predetermined intervals of time rather than in sequence with cycles of an engine.

As described above, the normalization methods may also be used to characterize knock level information based in measurements of in-cylinder pressures, accelerometers, or any other knock sensing device. In addition to estimating parameters of the probability distributions, other indicators based on knock level information (e.g. knock intensities) and probability distribution can be calculated. Calculating parameters, such as skewness and kurtosis excess, which may also be utilized to predict the likelihood of upcoming knock events, can be included in the process to characterize combustion knock events shown in FIG. 3.

Specifically in regard to the set up of sensing devices, for example the experimental set up 10 shown in FIG. 1, the analysis above described is generally performed on an individual cylinder basis, which means receiving signals from a suitable knock sensor or transducer in regards to an individual cylinder to estimate the parameter(s) of a distribution and the $n^{th}$ percentiles to control that individual cylinder. The same process described in FIG. 3 can also be repeated sequentially for other cylinders. Moreover, the same process can be performed by the ECU in parallel for all, or any combination, of the cylinders of an engine.

In some cases, the signal to noise ratio may be poor in some cylinders and it may be necessary to estimate parameters based on signals from other individual cylinders, a number of cylinders, or all cylinders of the engine combined. In the case of accelerometers, it is also possible to estimate parameters and calculate $n^{th}$ percentiles on an individual accelerometer basis. Thus, to predict upcoming knock events, it is possible to receive and process signals generated by at least one and any combination of the accelerometers. In reference to FIG. 1, accelerometers A1 and A2 are positioned to indicate an exemplary configuration where characterization of combustion knock events in done based on signals generated by two accelerometers. Furthermore, the characterization of combustion knock events based on signals generated by two accelerometers can include instructions, such as the ones shown in FIG. 3, to process signals from either one or both accelerometers as required by the characterization process.

Additionally, FIG. 1 shows accelerometer A3 positioned to indicate an exemplary configuration where characterization of combustion knock events is done based on signals generated by one accelerometer. In the particular case of accelerometers, it is to be understood that accelerometers may be positioned in any desired location on the engine and that other configurations to characterize combustion knock events can include the use of any number of accelerometers.

Some aspects to consider through-out the process of characterizing combustion knock events are the dynamic response and the steady state response of the process shown in FIG. 3. More specifically, the dynamic response and the steady state response of the process are generally related to the process of estimating the PDF and CDF parameters, such as $\mu$ and $\sigma$ in the particular case of a log-normal distribution. By varying the process to particularly estimate the parameters, it is sometimes possible to improve the dynamic response of the whole characterization process but this could cause to lower the performance of the characterization process in regards to the steady state response. In order to improve the transient response and the steady state response of the characterization process, the process (e.g. step 120) shown in FIG. 3 can include estimating two sets of parameters. For example, when characterizing the knock intensities with a log-normal distribution, it is possible to calculate two sets of $\mu$ and $\sigma$, where a first set of $\mu$ and $\sigma$ can be distinctly tailored to improve the steady state response and a second sent of $\mu$ and $\sigma$ can be distinctly tailored to improve the transient response of the characterization process.

In reference to the particular information shown in FIG. 2, it is possible to observe that knock intensity values corresponding to non-knocking conditions vary from 4.2 to 7.1, and knock intensity values corresponding to knocking conditions vary from 4.6 to 14.6. It is observed that under substantially constant engine conditions (such as speed, load, spark advance, fuel injected, and valve timing) the knock intensities vary significantly at least due to the non-linear aspects of the combustion events. Thus, one conclusion derived from the data shown in FIG. 2 is that knock intensities are a stochastic, non-stationary parameter. As described above, it is possible to characterize knock events with a probability distribution function. More specifically, one example includes utilizing a log-normal distribution, which includes the following PDF and CDF:

$$PDF(x) = \frac{1}{\sigma\sqrt{2\pi}x} e^{-(\ln(x)-\mu)^2/(2\sigma^2)} \tag{1}$$

$$CDF(x) = \frac{1}{2} + \frac{1}{2}\text{erf}\left[\frac{\ln(x)-\mu}{\sigma\sqrt{2}}\right] \tag{2}$$

where x corresponds to the knock intensity values shown in FIG. 2.

It can be shown that the maximum likelihood estimates based upon least square error are the mean and standard deviation of natural logarithm of x of a set of data of interest. Therefore, log-normal distribution parameters $\mu$ and $\sigma$ can be estimated by:

$$\mu_i = \frac{\sum_{j=i}^{j=i-N+1} \ln(x_j)}{N} \tag{3}$$

$$\sigma_i = \sqrt{\frac{\sum_{j=i}^{j=i-N+1} [\ln(x_j)]^2}{N} - (\mu_i)^2} \tag{4}$$

In order to reduce computational resources and improve the transient response to the characterization process, it is also possible to estimate the parameters $\mu$ and $\sigma$ as follows:

$$\mu_i = \sum_{j=i}^{j=i-N+1} b(i+1-j)\cdot\ln(x_j), \text{ where } \sum_{k=1}^{k=N} b(k) = 1. \tag{5}$$

$$\sigma = \sqrt{\sum_{j=i}^{j=i-N+1} [b(i+1-j)\cdot\ln(x_j)^2] - (\mu_i)^2} \tag{6}$$

In reference to the geometrical means of the knock intensities under knocking and non-knocking conditions shown in FIG. 2, it can be observed that the geometrical means are relatively more characteristic of the lower knock intensity values in most of the combustion events. Additionally, it is observed that about 5% of the knock intensities shown are representative of relatively high knock intensities and therefore indicate the presence of a knock event under that particular engine condition. As indicated above, calculating a $n^{th}$ percentile allows for tracking the relatively high knock intensities. The $n^{th}$ percentile is dependent on the log-normal parameters $\mu$ and $\sigma$ and it is represented with the following equation that is an inverse of the CDF presented as equation (2):

$$n^{th} \text{ Percentile} = \exp\left[\left(\text{erf}inv\left[\frac{n}{50} - 1\right] \cdot \sigma\sqrt{2}\right) + \mu\right] \quad (7)$$

FIG. 4 illustrates with solid lines the $99^{th}$ percentile of knock intensities measured under knocking and non-knocking conditions. It can be observed that equation (7) can be used to calculate any other percentile. Comparing FIGS. 2 and 4, it is possible to observe that the difference between knock intensities under knocking and non-knocking conditions is better illustrated in FIG. 4 due to calculating the $99^{th}$ percentile of the knock intensities. It is observed that calculating the $99^{th}$ percentile (or another relatively high $n^{th}$ percentile) helps isolate the relatively fewer combustion events where knock events occur. Moreover, equation (7) is utilized to calculate the $99^{th}$ percentile and the $25^{th}$ percentile of the knock intensities to normalize the knock intensities, as shown in FIG. 5.

Various features and advantages of the invention are set forth in the following claims.

What is claimed is:

1. A method of statistically characterizing combustion events in a combustion engine, the method comprising:
   receiving at least one signal indicative of knock level associated with combustion events;
   estimating at least one parameter of a probability density function and a cumulative distribution function based on receiving the at least one signal;
   estimating a probability distribution of the at least one signal based on estimating the at least one parameter; and
   calculating at least one value indicative of an $n^{th}$ percentile of the at least one signal based on the at least one parameter.

2. The method of claim 1, further comprising estimating at least one of a first alternative value indicative of skewness and a second alternative value indicative of kurtosis.

3. The method of claim 1, wherein receiving the at least one signal includes receiving at least one electric signal from at least one of an accelerometer and a pressure transducer coupled to an engine.

4. The method of claim 1, wherein estimating the probability distribution includes estimating at least one of a log-normal distribution, a beta distribution, a chi-squared distribution, a gamma distribution, an inverse chi-distribution, and an inverse gamma distribution.

5. The method of claim 1, wherein receiving the at least one signal includes receiving the at least one signal under knocking conditions.

6. The method of claim 1, wherein estimating the at least one parameter includes applying the at least one signal to at least one of an IIR filter and a FIR filter.

7. The method of claim 1, wherein calculating the at least one value includes calculating a value between about an $80^{th}$ percentile of the at least one signal and about a $99^{th}$ percentile of the at least one signal.

8. The method of claim 1, further comprising estimating a second parameter of the probability density function and the cumulative distribution function.

9. The method of claim 8, wherein calculating the at least one value includes calculating the at least one value based on the at least one parameter and the second parameter.

10. The method of claim 9, wherein calculating the at least one value includes calculating a value between about an $80^{th}$ percentile of the at least one signal and about a $99^{th}$ percentile of the at least one signal.

11. The method of claim 8, wherein estimating the second parameter includes estimating the second parameter based on estimating the at least one parameter.

12. The method of claim 8, wherein estimating the probability distribution includes estimating a log-normal probability distribution.

13. A method of statistically characterizing combustion events in a combustion engine, the method comprising:
   receiving at least one signal indicative of knock level associated with combustion events;
   estimating at least one parameter of a probability density function and a cumulative distribution function based on receiving the at least one signal; and
   estimating a probability distribution of the at least one signal based on estimating the at least one parameter, wherein estimating the at least one parameter includes calculating at least one of a running average and a standard deviation of the logarithm of the at least one signal.

14. The method of claim 13, wherein estimating the at least one parameter includes calculating at least one of the running average and the standard deviation of the natural log of the at least one signal to estimate at least one of a mean value and a standard deviation value.

15. A method of statistically characterizing combustion events in a combustion engine, the method comprising:
   receiving at least one signal indicative of knock level associated with combustion events;
   estimating at least one parameter of a probability density function and a cumulative distribution function based on receiving the at least one signal; and
   estimating a probability distribution of the at least one signal based on estimating the at least one parameter, wherein estimating the at least one parameter includes calculating at least one of a weighted average and a standard deviation of the logarithm of the at least one signal.

16. The method of claim 15, wherein estimating the at least one parameter includes calculating at least on of the weighted average and the standard deviation of the natural log of the at least one signal to estimate at least one of a mean value and a standard deviation value.

17. A method of predicting combustion knock events based on real-time statistical characterization of knock level metrics, the method comprising:
   receiving at least one signal indicative of knock level;
   estimating a first parameter of a probability density function and a cumulative distribution function based on the at least one signal indicative of knock level;
   calculating a first value indicative of an $n^{th}$ percentile of the at least one signal;

calculating a second value indicative of the $n^{th}$ percentile of the at least one signal; and comparing the first value to the second value to predict an upcoming combustion knock event.

18. The method of claim 17, further comprising estimating a probability distribution based on the first parameter.

19. The method of claim 17, wherein estimating the first parameter includes calculating the running average of the logarithm of the at least one signal.

20. The method of claim 19, wherein estimating the first parameter includes calculating the running average of the natural log of the at least one signal to estimate a mean value.

21. The method of claim 17, wherein estimating the first parameter includes calculating the weighted average of the logarithm of the at least one signal.

22. The method of claim 21, wherein estimating the first parameter includes calculating the weighted average of the natural log of the at least one signal to estimate a mean value.

23. The method of claim 17, wherein calculating the first value includes calculating a value between about an $80^{th}$ percentile of the at least one signal and about a $99^{th}$ percentile of the at least one signal when the at least one signal indicative of knock level is received under knocking conditions of an engine.

24. The method of claim 17, wherein calculating the second value includes calculating a value between about an $80^{th}$ percentile and about of the at least one signal and about a $99^{th}$ percentile of the at least one signal when the at least one signal indicative of knock level is received under non-knocking conditions of an engine.

25. The method of claim 17, wherein receiving the at least one signal includes receiving at least one electric signal from at least one of an accelerometer and a pressure transducer coupled to an engine.

26. The method of claim 17, further comprising estimating a probability distribution based on the first parameter, wherein estimating the probability distribution includes estimating at least one of a log-normal distribution, a beta distribution, a chi-squared distribution, a gamma distribution, an inverse chi-distribution, and an inverse gamma distribution.

27. The method of claim 17, wherein comparing the first value to the second value includes calculating a ratio of the first value with respect to the second value.

28. The method of claim 17, wherein comparing the first value to the second value includes calculating the difference between the first value and the second value.

29. The method of claim 17, further comprising estimating a second parameter of the probability density function and the cumulative distribution function.

30. The method of claim 29, wherein calculating the first value includes calculating a value between about an $80^{th}$ percentile of the at least one signal and about a $99^{th}$ percentile of the at least one signal based on the first parameter and the second parameter when the at least one signal indicative of knock level is received under knocking conditions of an engine.

31. The method of claim 29, wherein calculating the second value includes calculating a value between about an $80^{th}$ percentile of the at least one signal and about a $99^{th}$ percentile of the at least one signal based on the first parameter and the second parameter when the at least one signal indicative of knock level is received under non-knocking conditions of an engine.

32. A method of predicting combustion knock events based on knock level values substantially independent of knock conditions, the method comprising:

receiving at least one signal indicative of knock level;

estimating a first parameter of a probability density function and a cumulative distribution function based on the at least one signal indicative of knock level;

calculating a first value indicative of a first $n^{th}$ percentile of the at least one signal based on the first parameter;

calculating a second value indicative of a second $n^{th}$ percentile of the at least one signal based on the first parameter; and normalizing the first value with respect to the second value to predict an upcoming combustion knock event substantially independent on knock conditions.

33. The method of claim 32, further comprising estimating a probability distribution based on the first parameter.

34. The method of claim 32, wherein receiving the at least one signal includes receiving at least one electric signal from at least one of an accelerometer and a pressure transducer mounted coupled to an engine.

35. The method of claim 32, further comprising estimating a probability distribution based on the first parameter, wherein estimating the probability distribution includes estimating at least one of a log-normal distribution, a beta distribution, a chi-squared distribution, a gamma distribution, an inverse chi-distribution, and an inverse gamma distribution.

36. The method of claim 32, wherein estimating the first parameter includes calculating a weighted average of the logarithm of the at least one signal to estimate a mean value.

37. The method of claim 32, wherein estimating the first parameter includes calculating a running average of the logarithm of the at least one signal to estimate a mean value.

38. The method of claim 32, wherein estimating the first parameter includes applying the at least one signal to at least one of an IIR filter and a FIR filter.

39. The method of claim 32, wherein calculating the first value includes calculating a value between about an $80^{th}$ percentile of the at least one signal and about a $99^{th}$ percentile of the at least one signal, and wherein calculating the second value includes calculating a value between about a $15^{th}$ percentile of the at least one signal and about a $35^{th}$ percentile of the at least one signal.

40. A method of substantially eliminating a measurement error related at least to a gain of an accelerometer coupled to an engine for predicting combustion knock events, the method comprising:

generating at least one electric signal with the accelerometer;

calculating at least one knock level based on the at least one electric signal;

estimating a first parameter of a probability density function and a cumulative distribution function based on the at least one knock level;

calculating a first value indicative of a first $n^{th}$ percentile of the at least one knock level based on the first parameter;

calculating a second value indicative of a second $n^{th}$ percentile of the at least one knock level based on the first parameter; and normalizing the first value with respect to the second value for substantially eliminating the measurement error in predicting upcoming combustion knock events.

* * * * *